United States Patent
Klose et al.

(10) Patent No.: US 8,207,833 B2
(45) Date of Patent: Jun. 26, 2012

(54) METHOD FOR MAKING A COMMUNICATION AVAILABLE

(75) Inventors: Hans-Peter Klose, Stuttgart (DE); Wilfried Tenten, Gammertingen (DE)

(73) Assignee: Robert Bosch GmbH, Stuttgart (DE)

(*) Notice: Subject to any disclaimer, the term of this patent is extended or adjusted under 35 U.S.C. 154(b) by 776 days.

(21) Appl. No.: 11/901,522

(22) Filed: Sep. 17, 2007

(65) Prior Publication Data

US 2008/0074242 A1 Mar. 27, 2008

(30) Foreign Application Priority Data

Sep. 22, 2006 (DE) .................... 10 2006 044 772

(51) Int. Cl.
*B60Q 1/00* (2006.01)
(52) U.S. Cl. ................. 340/425.5; 340/989; 340/539.19
(58) Field of Classification Search ............... 340/425.5, 340/988, 989, 991, 990, 427, 426.13–426.19, 340/426.25, 516, 539.19, 595, 687
See application file for complete search history.

(56) References Cited

U.S. PATENT DOCUMENTS

| | | | | |
|---|---|---|---|---|
| 4,625,081 A * | 11/1986 | Lotito et al. | | 379/88.26 |
| 5,165,091 A * | 11/1992 | Lape et al. | | 370/216 |
| 5,303,393 A * | 4/1994 | Noreen et al. | | 455/3.02 |
| 5,365,516 A * | 11/1994 | Jandrell | | 370/335 |
| 6,816,707 B1 * | 11/2004 | Barker et al. | | 455/41.2 |
| 6,826,669 B1 * | 11/2004 | Le et al. | | 711/173 |
| 6,934,749 B1 * | 8/2005 | Black et al. | | 709/224 |
| 7,028,087 B2 * | 4/2006 | Caveney | | 709/224 |
| 7,245,625 B2 * | 7/2007 | Manis et al. | | 370/401 |
| 2002/0042286 A1 * | 4/2002 | Ogoro | | 455/550 |
| 2002/0065625 A1 * | 5/2002 | Xydis | | 702/127 |
| 2002/0146999 A1 * | 10/2002 | Witte | | 455/345 |
| 2003/0119568 A1 * | 6/2003 | Menard | | 455/572 |
| 2006/0026269 A1 * | 2/2006 | Sadovsky et al. | | 709/222 |

FOREIGN PATENT DOCUMENTS

| | | |
|---|---|---|
| DE | 199 46 76 | 4/2001 |
| DE | 100 48 808 | 4/2002 |
| DE | 101 38 121 | 2/2003 |

* cited by examiner

*Primary Examiner* — Daniel Previl
(74) *Attorney, Agent, or Firm* — Kenyon & Kenyon LLP

(57) ABSTRACT

A method for making a communication available between data modules that are interconnected via communication units of a device for making the communication available, in which at least one data module is automatically selected by at least one communication unit via a data protocol.

14 Claims, 1 Drawing Sheet

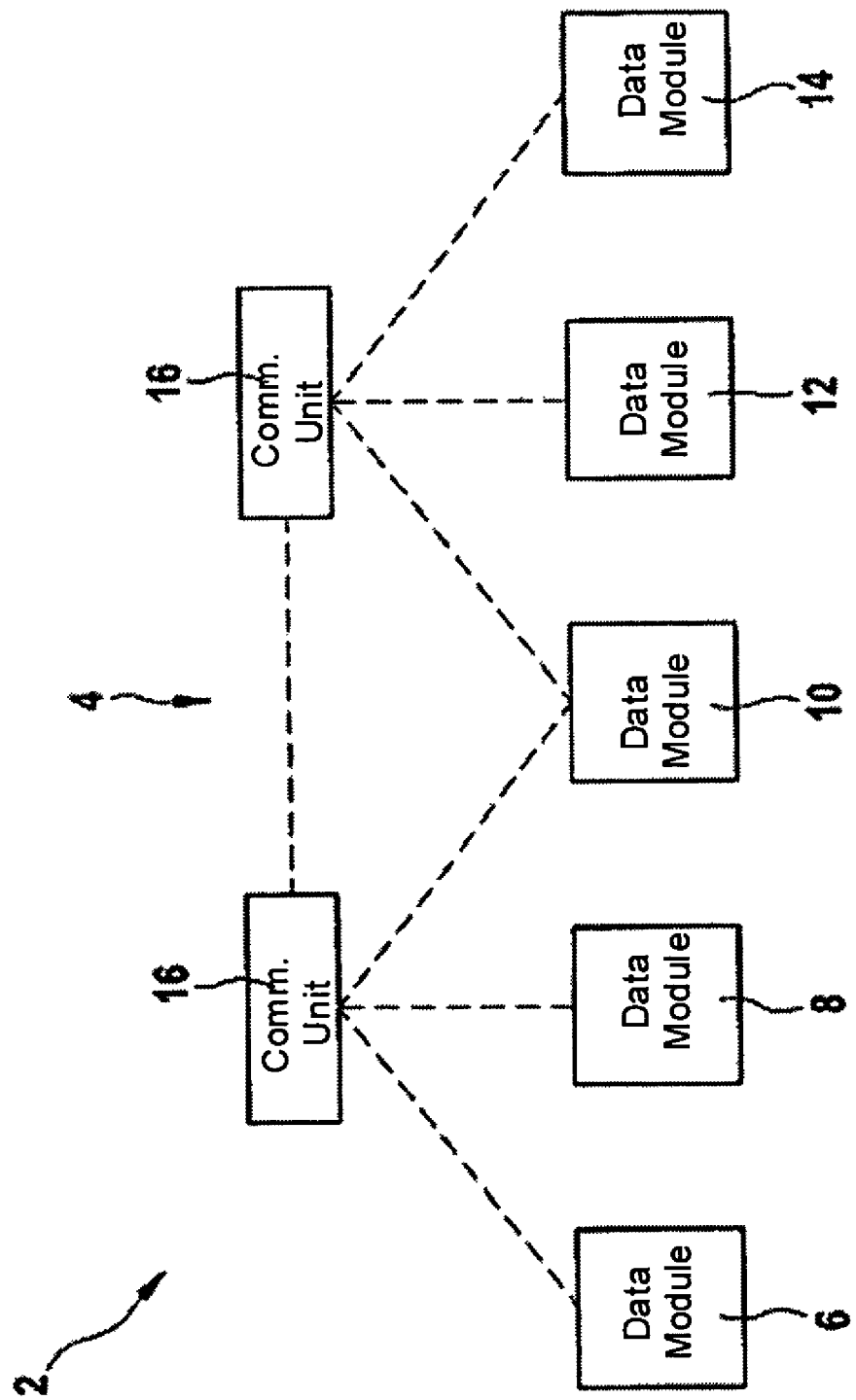

METHOD FOR MAKING A COMMUNICATION AVAILABLE

FIELD OF THE INVENTION

The present invention relates to a method for making a communication available, a device for making a communication available, a computer program, and a computer program product.

BACKGROUND INFORMATION

Sensor systems are usually made up of a sensor unit, a sensor data conditioning system, and a communication interface. These sensor units are, in general, coupled to one another by way of wire connections. Provision is made for future sensor systems to be equipped as modular assemblies with automatic adaptation to the central control units. These sensor systems must enable interference-proof and radiation-free communication between individual sensors and a control device.

German Patent Application No. DE 100 48 808 describes a method and an apparatus for controlling operational sequences, in particular in a vehicle, at least one sensor having a connection unit being connected, via a bus system, to at least one control unit in order to control the operational sequences. This control unit likewise has a connection unit through which the sensor data are transferred to the control unit. Provision is further made that the control unit reads in and/or processes the sensor data at predefinable synchronization points.

A method and an assemblage for initializing a number of similar secondary control devices is described in German Patent Application No. DE 199 46 769. Here the similar secondary control devices are connected downstream from a primary control device. In the method, the secondary control devices are connected to a controllable voltage supply for the primary control device. Identification signals are then transmitted from each secondary control device to the primary control device. An initialization of a secondary control device that is yet to be initialized is accomplished by maintaining the voltage supply of the secondary control device to be initialized while simultaneously interrupting the voltage supply for the other secondary control devices. An initialization signal is transferred in each case from the primary control device to the secondary control device that is to be initialized.

An electronic system and a method for addressing devices is described in German Patent Application No. DE 101 38 121. A first bus system that is based on static addresses, as well as a second bus system that is based, upon an initialization, on addresses to be assigned dynamically, is provided here. Static addresses are furthermore allocated to the second bus system. This system has means for transforming a dynamic address into a quasi-static address, the quasi-static address encompassing the static addresses allocated to the second bus system.

SUMMARY OF THE INVENTION

In the method according to the present invention for making a communication available between data modules that are interconnected via communication units of a device for making the communication available, a data module is automatically selected by at least one communication unit via a data protocol.

In an embodiment of the present invention, an identity of a data module is defined via a parameter embodied as a dynamic or static identification code and, as a further parameter, via a structure of the data to be transferred by way of the data protocol, i.e. typically by way of multiple parameters of the data protocol.

The identification code of the data module provided for the definition of identity can have two regions separated from one another, a first region having an identification of the device for making the communication available, and a second region having an identification of the data module.

The identification code for a data module is generated automatically by a code generator via a random pattern. Such generation can occur on different occasions and/or at different points in time, for example upon an initial commissioning of the data module, after a modification of the device and thus of the communication units or of at least one of the data modules, and also after a disruption of an assemblage that encompasses the device and the data modules.

In order to ascertain the identification code, a starting sequence that has a non-repeatable or unique digit combination, for example a chassis number of a vehicle, is regularly used.

It is thus possible for a new data module arriving during operation of the device to be automatically adapted to the device.

The present invention further relates to a device for making a communication available between data modules, which has communication units for connecting the data modules, and in which the communication units are embodied to automatically select data modules via a data protocol.

This device has, as a rule, a code generator embodied for automatic generation of an identification code. The device can moreover be embodied to make an at least partially, as a rule entirely, wireless communication available. In one application, the device is embodied to make a communication available in a vehicle.

The device can in general have at least one module, in particular the code generator, this at least one module being embodied to carry out at least one step of the method according to the present invention and/or to make available at least one of the functions set forth above of the device. Any programmable device, for example a computer, a calculation unit, an ASIC or application-specific integrated circuit, an FPGA or programmable logic circuit, or the like, can be provided as the at least one module.

The computer program according to the present invention having program code means is provided for carrying out all the steps of a method as described when the computer program is executed on a computer or a corresponding calculation unit, in particular in a device according to the present invention described above.

The present invention furthermore relates to a computer program product having program code means that are stored on a computer-readable data medium in order to carry out all the steps of a method according to the present invention when the computer program is executed on a computer or a corresponding calculation unit, in particular in a device according to the present invention.

The present invention thus makes available a modular architecture for data acquisition assemblages or data acquisition systems. With the aid of simple but interference-resistant data protocols, a communication is made possible between any desired data modules, which are embodied as sensors or as actuators and thus as data transmitters or data receivers. In possible applications, the data modules can be attached and thus connected to control devices. The data modules are automatically adapted and equalized, and connected in unequivocally identifiable fashion in terms of data, to the device and thus to an existing communication network, so that the installation of data modules is limited only to mechanical expansion and a subsequent startup/calibration cycle.

The data modules can be attached either with the aid of a traditional motor-vehicle-capable wire-guided interface or by radio, with and without battery operation in the sensor surroundings. Directly after attachment, the identification code is automatically generated via the random pattern upon initial commissioning, although identification codes already in use are omitted in this context. This identification code can be static, so that it is used permanently, or it can be dynamic, which means that the identification code is replaced at fixed time intervals or upon request. An additional dynamic adaptation of the identification code can react to the presence of interference. When a device or data module is addressed, a new identification code of the relevant device is thereupon generated in accordance with the random pattern.

It is conceivable for a device activation to proceed erroneously, for example due to interference from the environment. It is, however, extremely improbable that after an adaptation of the identification code, an interfering apparatus and the device being interfered with will have the same identification code. Operating reliability can, however, be further improved by way of a code generator optimized for code redundancy prevention. Code generators of this kind use, in order to ascertain the identification code, starting sequences that utilize non-repeatable number combinations. In a motor vehicle context, one such number combination is, for example, the chassis number.

The device architecture or system architecture necessary for this has, as components, the code generator, interfaces, data protocols, control signals, and an energy supply.

The present invention provides capabilities for an interference-insensitive data communication that automatically adapts itself. A data transfer link is made up substantially of a radio link that connects a large number of data modules to at least one communication unit, in particular a transmission and/or reception unit.

The data modules can on the one hand be supplied with outside voltage, for example using a supply conductor from the motor vehicle's own network, or they can utilize the energy of the radio field or other autonomous energy sources for data acquisition and data communication operation.

In an embodiment, data acquisition and data communication are carried out both continuously in time, in cyclically timed fashion, or also in a manner activated only on demand. By way of an allocation specification, for example a module identification number, each data module has the identification code assigned to it in unequivocally addressable fashion. When a communication unit selects a data module of this kind by activation of the relevant identification code, that data module wakes up and scans the radio link. After this procedure of a "ready-to-operate" report, the data communication is carried out.

Parallel communications are also conceivable if the system is designed for parallel communication; "parallel data communication" means that at least two data modules and/or communication units are operated simultaneously. It is thus necessary to keep these communications separate from one another. This can be done by way of suitable HF or carrier methods, for example separation of channels in the case of frequency modulation (FM), separation of the upper and lower sidebands in amplitude modulation, and different carrier frequencies and grouping thereof into primary groups, secondary groups, etc.

A device for modular data acquisition constructed in this fashion can be enhanced by the fact that all the data modules are automatically detected. A data protocol that defines on the one hand the identity of the data module and on the other hand the structure of the data is used for this. The identity of the data module is critical for communication security. If one identity is defined with code 7, for example, then any other transmitter that sends the code can activate the data module, but only if the data structure is additionally OK and optionally if a further parameter of the data protocol is OK.

Data-generating and data-acquiring data modules that are disposed in poorly accessible locations can, as a rule, exchange data only wirelessly by radio transfer. A data transfer of this kind is, however, susceptible to interference because of the possible influence of other radio devices. In addition, the wirelessly communicating data modules can likewise interfere with other radio devices.

For this reason, in an embodiment of the present invention the identification of the data modules actually present in the communication network is determined unequivocally. This is done by way of two mutually separate regions in an identification code or a code word. A first region contains an identification of the communication network, and the second region an identification pertinent to the data module. With the aid of known coding methods that are applicable here, this identification can also be regarded as secure in a motor-vehicle context for unequivocal communication network assignments. These coding methods can also utilize a so-called "scrambling code" that permits very good identification security by way of a certain dispersion over time. A definite improvement in interference-free identification is likewise possible if the coding method is changed at time intervals.

A stochastic code modification can furthermore be achieved, on request, by the fact that a selected data unit is contacted by radio, and the identification code is modified immediately after code recognition. For example, if a subassembly having multiple data modules is incorrectly selected, it can also at first transmit a signal that, in some circumstances, can result in misinterpretations. But if a redundancy of the data polling of the identification code is configured such that the control device belonging to the communication chain performs a modification of the identification code, it is then very improbable that an adjacent or interfering communication network will perform exactly the same modification. The redundant data transfer is thus performed using a completely different identification code. Only when both data are recognized as belonging to the same data module, for example by data identity or by other appropriate characteristics, is that datum characterized as valid. Interference resistance is further enhanced when a random generator uses a starting number (seed) that is unique. In motor vehicle operation, a good choice here is the chassis number.

The present invention can be utilized in products that are typical of motor vehicles and are used for data acquisition in critical environments, such as the tires, engine compartment, shock absorbers, emissions control system, and the like. Provision is made in this context for motor-vehicle apparatuses of this kind each to have at least one data module, embodied as a sensor and/or actuator, allocated to them. A device or system of this kind is likewise usable as a wire-based motor vehicle communication device.

BRIEF DESCRIPTION OF THE DRAWING

FIG. 1 shows a specific embodiment of a device according to the present invention.

DETAILED DESCRIPTION

Assemblage 2 shown schematically in FIG. 1 has a device 4 for making a communication available between data modules 6, 8, 10, 12, 14. This device 4 encompasses, in the present embodiment, two communication units 16 that are embodied to make available, between data modules 6, 8, 10, 12, 14, a communication network that in this embodiment is wireless, as indicated by the dashed lines. In the present embodiment, first data module 6 is embodied as a control device. Second and third data modules 8, 10 are each embodied as a sensor, and the fourth and fifth data modules 12, 14 each as an actuator.

Communication units 16 communicate for this purpose with one another and with data modules 6, 8, 10, 12, 14. Communication units 16 are embodied to automatically address or select data modules 6, 8, 10, 12, 14 via a data protocol.

The data protocol is defined by way of a number of parameters. In the present embodiment, it is possible by way of these parameters to define an identity of each data module 6, 8, 10, 12, 14 via an identification code of the respective data module 6, 8, 10, 12, 14 and via a structure of the data transferred via the communication network.

What is claimed is:

1. A method for making a communication available between data modules that are interconnected via communication units of a device for making the communication available, the method comprising:
   automatically detecting at least one data module by at least one communication unit via a data protocol; and
   defining an identity of the detected data module via an identification code and via a structure of data to be transferred by way of the data protocol;
   wherein the identification code of the data module provided for defining the identity has two regions separated from one another, including a first region encompassing an identification of the device for making the communication available and a second region encompassing an identification of the data module.

2. The method according to claim 1, further comprising:
   automatically generating the identification code for a data module by a code generator via a random pattern.

3. The method according to claim 2, wherein a starting sequence is used to ascertain the identification code.

4. The method according to claim 3, wherein the starting sequence is a chassis number of a vehicle.

5. The method according to claim 2, wherein the automatic generation of the identification code occurs upon an initial commissioning of the data module, after a modification of the device, or after a disruption of an assemblage that encompasses the device and the data modules.

6. The method according to claim 2, wherein the automatic generation of the identification code occurs upon an initial commissioning of the data module, after a modification of the device, or after a disruption of an assemblage that encompasses the device and the data modules, wherein the data modules are sensors or actuators, and wherein the identification code is dynamic.

7. The method according to claim 1, further comprising:
   automatically adapting a new data module arriving during operation of the device to the device.

8. The method according to claim 1, wherein the data modules are sensors or actuators.

9. The method according to claim 1, wherein the identification code is dynamic.

10. A device for making a communication available between data modules, comprising:
    a plurality of communication units for connecting the data modules, the communication units being adapted to automatically detect data modules via a data protocol, and
    defining an identity of the detected data module via an identification code and via a structure of data to be transferred by way of the data protocol;
    wherein the identification code of the data module provided for defining the identity has two regions separated from one another, including a first region encompassing an identification of the device for making the communication available and a second region encompassing an identification of the data module.

11. The device according to claim 10, further comprising:
    a code generator for automatic generation of an identification code.

12. The device according to claim 10, wherein the device makes an at least partially wireless communication available.

13. The device according to claim 10, wherein the device makes a communication available in a vehicle.

14. A computer-readable medium having a computer program, which is executable by a processor, comprising:
    a program code arrangement having program code for making a communication available between data modules that are interconnected via communication units of a device by performing the following:
    automatically detecting at least one data module by at least one communication unit via a data protocol, and
    defining an identity of the detected data module via an identification code and via a structure of data to be transferred by way of the data protocol;
    wherein the identification code of the data module provided for defining the identity has two regions separated from one another, including a first region encompassing an identification of the device for making the communication available and a second region encompassing an identification of the data module.

* * * * *